May 20, 1924.
E. MATTLET
1,494,857
APPARATUS FOR CONTROLLING THE BRAKES ON THE STEERING WHEELS OF VEHICLES
Filed March 22, 1923
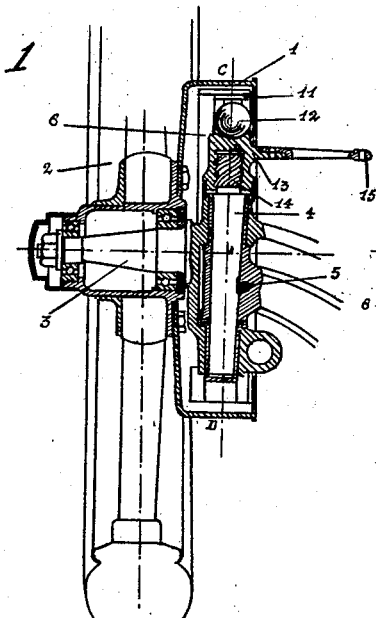
Inventor:
Ernest Mattlet
Attorney.

Patented May 20, 1924.

1,494,857

UNITED STATES PATENT OFFICE.

ERNEST MATTLET, OF LIEGE, BELGIUM.

APPARATUS FOR CONTROLLING THE BRAKES ON THE STEERING WHEELS OF VEHICLES.

Application filed March 22, 1923. Serial No. 626,968.

*To all whom it may concern:*

Be it known that I, ERNEST MATTLET, subject of the King of Belgium, residing at Liege, in the Kingdom of Belgium, have invented certain new and useful Improvements in Apparatus for Controlling the Brakes on the Steering Wheels of Vehicles, of which the following is a specification.

This invention has for its object to provide an improved apparatus for controlling the brakes on the steering wheels of vehicles, and more particularly motor vehicles.

It is known in such devices to force the braking blocks against the braking pulley by an element which is connected to a piece provided with a spherical surface bearing against a spherical surface provided on a member controlled by the driver.

According to the present invention, the element for forcing the brake blocks is formed by a spherical ball, so that it bears itself the above said spherical surfaces.

Two constructional forms of this invention are illustrated by way of example in the accompanying drawings in which:—

Figure 1 is a section taken along the line A—B of Figure 2;

Figure 2 is a section taken along the line C—D of Figure 1.

Figure 3 illustrates a detail.

Figure 4 is a section taken along the line E—F of Figure 5, and

Figure 5 is a section taken along the line G—H—I—J of Figure 4.

As shown the brake drum 1 is fixed to the steering road wheel 2 by means of nuts and bolts so as to revolve with the said wheel around the axle journal 3. The wheel 2 and drum 1 are able on the one hand to assume an inclination in relation to the longitudinal axis of the vehicle chassis by pivoting around the axle journal pivot pin 4 which connects the journal to the axle in a well known manner shown in the drawings.
This axle journal pivot pin is fixed to the axle by means of a pin 5 or any other suitable device that will prevent its rotation. In the interior of the drum 1 there are arranged brake blocks 6 pivoted at 7 to a lug 8 fixed to a sleeve 9 that rotates with the axle journal. These brake blocks are acted upon by springs 10 which have a tendency to bring the said blocks closer together towards the axis of the axle journal pivot pin. The brake blocks carry at their free ends, plates 11 which are fixed to them and which are inclined and arranged symmetrically in relation to the axis of the axle journal pivot pin in such a manner as to constitute the sides of an angle having its apex situated towards the outside of the brake.

A ball 12 arranged between the aforesaid plates and which moves strictly along the axis of the axle journal pivot pin, acts as a wedge between the aforesaid plates in order to force the brake blocks apart and consequently produce the braking action by the friction of these brake blocks against the drum.

In the first constructional form illustrated in Figures 1 and 2, this movement of the ball is due to the movement of an internally screw-threaded cap 13 whose internal screw-thread engages the corresponding thread 14 formed on the end of the axle journal pivot pin. The cap 13 being fixed to the brake operating lever 15, it is possible by actuating said lever to impart rotational motion to the cap 13 and consequently cause it to move along its axis.

In the constructional form illustrated in Figures 4 and 5, the axle journal pivot pin is likewise screw-threaded, and it is bored throughout its length so as to allow the rod 16 to be passed therethrough which is fixed to the internally screw-threaded cap 17. This rod thus follows the movements of the cap 17 and transmits to the ball 12 the thrust which causes the brakes to come into action.

It is obvious that the relative axial movement of the fixed axle journal pivot pin and aforesaid cap may be produced by any other suitable means such as a set of helical inclines.

It is to be noted that the surface of the thrust member coming in contact with the ball is a concave surface such that the point of contact of the ball with said surface is situated on the axis of the axle journal pivot pin. The result is that, whatever may be the position of the parts of the brake, the pivotal movement of the ball will always take place in one point only, and will therefore not offer any resistance, while on the other hand this pivotal movement of the ball can never alter its axial position.

What I claim is:

1. A brake for steering wheels comprising a brake drum mounted on a wheel; a sleeve rigidly secured to the axle of said wheel; a pair of brake blocks each pivoted at one end to said sleeve; a pivot pin mounted in said sleeve and having one end screw-threaded; a brake lever having a screw-threaded cap portion mounted on the screw-threaded end of said pivot pin; and a ball on said cap portion and adapted to be associated with the free ends of the brake blocks to force the blocks against the brake drum on actuation of said brake lever.

2. A brake for steering wheels comprising a brake drum mounted on a wheel; a sleeve rigidly secured to the axle of said wheel; a pair of brake blocks each pivoted at one end to said sleeve; a pivot pin mounted in said sleeve; a brake lever having a cap portion; and a ball associated with the end of said pivot pin and the free ends of the brake blocks to force said blocks against the brake drum on actuation of said brake lever.

3. A brake for steering wheels comprising a brake drum fixed to a wheel; a pivot pin mounted in said drum and on the axle; brake blocks pivoted in said drum, a ball freely associated with said blocks; and means on said pivot pin for forcing the ball between the ends of said brake blocks.

4. A brake for steering wheels comprising a brake drum fixed to a wheel; brake blocks pivotally arranged in said drum; a plate fixed to each block; a cup-shaped cap actuator mounted in said brake drum; and a ball between said plates and on said cap adapted to be forced between said blocks, said ball being free to rotate in all directions.

5. A brake for steering wheels comprising an axle; a housing for said axle; a brake drum mounted on said housing; a pivot pin mounted in said housing and having a screw-threaded portion at one end; a pair of brake blocks pivoted at one end to the housing of said axle; a ball freely associated between the free ends of said brake blocks; and means on the screw threaded portion of said pin for forcing the ball radially in order to force the brake blocks against the brake drum.

In testimony whereof I affix my signature.

ERNEST MATTLET.

Witnesses:
CHARLES MERCHIE,
YVONNE RIGS.